(12) United States Patent
Hellat et al.

(10) Patent No.: US 7,516,608 B2
(45) Date of Patent: Apr. 14, 2009

(54) METHOD FOR OPERATING A GAS TURBINE

(75) Inventors: Jaan Hellat, Baden-Ruetihof (CH);
Oliver Riccius, Birmenstorf (CH);
Richard Smith, Ennetbaden (CH);
Detlef Viereck, Lauchringen (DE)

(73) Assignee: ALSTOM Technology Ltd., Baden (CH)

( * ) Notice: Subject to any disclaimer, the term of this patent is extended or adjusted under 35 U.S.C. 154(b) by 410 days.

(21) Appl. No.: 11/206,074

(22) Filed: Aug. 18, 2005

(65) Prior Publication Data

US 2006/0174630 A1 Aug. 10, 2006

Related U.S. Application Data

(63) Continuation of application No. PCT/EP2004/050204, filed on Feb. 25, 2004.

(30) Foreign Application Priority Data

Feb. 27, 2003 (DE) ................ 103 08 384

(51) Int. Cl.
*F02C 3/22* (2006.01)
(52) U.S. Cl. ..................... 60/39.465; 60/772
(58) Field of Classification Search ............ 60/772, 60/776, 39.465
See application file for complete search history.

(56) References Cited

U.S. PATENT DOCUMENTS 4,255,927 A 3/1981 Johnson et al.
4,507,558 A * 3/1985 Bonne ................. 250/345
4,594,510 A * 6/1986 Brown et al. ......... 250/339.13
4,951,503 A * 8/1990 Fini ..................... 73/23.35
6,082,092 A * 7/2000 Vandervort .............. 60/773
6,438,937 B1* 8/2002 Pont et al. ............... 60/776
6,813,875 B2* 11/2004 Inoue ................ 60/39.281
7,216,486 B2* 5/2007 Doebbeling et al. ....... 60/773
2004/0036023 A1* 2/2004 Hodgkinson ......... 250/339.13
2004/0220751 A1* 11/2004 Morrow et al. ............ 702/24
2005/0028530 A1* 2/2005 Doebbeling et al. ....... 60/773
2006/0283519 A1* 12/2006 Campbell ................. 141/82
2007/0265778 A1* 11/2007 Suter et al. ................ 702/1
2008/0083228 A1* 4/2008 Myhre .................... 60/773

FOREIGN PATENT DOCUMENTS

DE 19838361 3/1999

(Continued)

OTHER PUBLICATIONS

Search Report for German Patent Appl. No. 10308384.7 (Dec. 19, 2003).

(Continued)

*Primary Examiner*—William H Rodriguez
(74) *Attorney, Agent, or Firm*—Cermak Kenealy Vaidya & Nakajima LLP; Adam J. Cermak

(57) ABSTRACT

A method for operating a gas turbine (2), in particular in a power plant, includes operating the gas turbine (2) with natural gas. In order to adapt the gas turbine operation to different natural gas qualities, a concentration of $C_2+$ is measured in the natural gas during gas turbine (2) operation. The gas turbine (2) then is operated based on the current concentration of $C_2+$.

22 Claims, 2 Drawing Sheets

FOREIGN PATENT DOCUMENTS

| | | |
|---|---|---|
| DE | 10302487 | 7/2003 |
| EP | 1102005 | 5/2001 |
| JP | 61053425 | 3/1986 |
| JP | 07102998 | 4/1995 |
| JP | 08170544 | 7/1996 |
| JP | 2003056369 | 2/2003 |
| WO | WO88/08075 | 10/1988 |
| WO | WO03/010426 | 2/2003 |
| WO | WO03/062618 | 7/2003 |
| WO | WO 03/062618 A1 * | 7/2003 |
| WO | WO2004/076925 | 9/2004 |

OTHER PUBLICATIONS

International Search Report for PCT Appl. No. PCT/EP2004/050204 (Aug. 16, 2004).

* cited by examiner

METHOD FOR OPERATING A GAS TURBINE

This application is a Continuation of and claims priority under 35 U.S.C. § 120 to International application number PCT/EP2004/050204, filed 25 Feb. 2004, and claims priority under 35 U.S.C. § 119 to German patent application number 103 08 384.7, filed 27 Feb. 2003, the entireties of both of which are incorporated by reference herein.

BACKGROUND OF THE INVENTION

1. Field of the Invention

The present invention relates to a method for operating a gas turbine, in particular in a power plant.

2. Brief Description of the Related Art

Usually gas turbines are fueled with natural gas. Natural gas is mainly comprised of $CH_4$ (methane). Furthermore, natural gas also contains so-called non-$CH_4$ components that can be diluting or enrichment substances. Examples of diluting substances are $N_2$ (nitrogen) and $CO_2$ (carbon dioxide). Enrichment substances usually are higher saturated hydrocarbons such as $C_2H_6$ (ethane), $C_3H_8$ (propane), butane, etc.

Currently it is customary to characterize the quality, i.e., the composition of natural gas, by using two indices. These are the calorific value on one hand and the Wobbe index on the other hand. Up until now it furthermore has been customary to operate gas turbines with natural gas of consistent quality.

Today gas supply companies are not yet able to guarantee consistent quality for the natural gas they supply. As part of the liberalization of the natural gas market, natural gas suppliers increasingly attempt to optimize natural gas demand and natural gas prices. The result is that natural gas is obtained from different sources, is mixed and supplied to the consumers. This in turn results in a high degree of variability of the natural gas with regard to quality and/or composition. The composition of natural gas in turn can influence the combustion process in gas turbines. The indices known up until now (calorific value and Wobbe index) are not suitable to describe these effects on the operation of gas turbines with the necessary degree of accuracy. Therefore, power plant operators must be prepared for varying natural gas quality in the future.

SUMMARY OF THE INVENTION

This is where the invention would like to offer a remedy. One aspect of the present invention provides an improved embodiment for a gas turbine or for a related operating method that above all would allow accommodating different natural gas qualities.

One principle of the present invention includes the general idea of measuring the current composition of the natural gas supplied to the gas turbine during the operation, i.e., online, and of adapting the operating concept of the gas turbine to the respective current natural gas composition. Substantial for the invention is the fact that the composition of the natural gas is characterized based on the share or the concentration of $C_2+$ in the natural gas. $C_2+$ is the abbreviation for all higher saturated hydrocarbons, i.e., all hydrocarbons with the exception of $CH_4$. The invention utilizes the knowledge that it suffices to measure the concentration of $C_2+$ in an integral manner in order to obtain a sufficient characterization of the natural gas composition. Above all it is not necessary to determine the concentration of individual dilution substances. Furthermore, as a rule, it is not necessary to separately determine the concentrations of $C_2H_6$, $C_3H_8$, etc. This results in an extreme simplification for the determination of another index that characterizes the quality of natural gas, namely the concentration of $C_2+$.

An increase in $C_2+$ concentration in natural gas results in an ignition delay time decrease, as well as spontaneous ignition temperature decrease in the combustion process of the gas turbine that is supplied with this natural gas. Furthermore, the concentration of $C_2+$ affects the upper and lower mixing limit for inflammable natural gas and air mixtures. Furthermore, the $C_2+$ concentration can have an effect on the chemical reaction path, which in turn changes the burn-out degree and the emission values of the combustion reaction. Additionally, a change in the $C_2+$ concentration can effect a change in the Wobbe index and/or the calorific value, which can be used to influence the injection impulse and the mixing properties of natural gas and combustion air. For example, in a typical premix combustion system this means that the position of a reaction zone depends on the quality of the natural gas. This means that the flame front in the gas turbine combustion approaches the burner with increasing $C_2+$ concentration. Therefore, an increase in $C_2+$ concentration consequently increases the chances of a flashback and an overheating of the burner, which in turn can lead to an increase in pollutant emissions, especially NO, emissions.

In order to be able to differentiate the effects of the $C_2+$ content in natural gas on the gas turbine process, a further development of the method in accordance with the invention proposes to also measure $C_3+$ concentrations that are present in the natural gas during the operation of the gas turbine and to operate the gas turbine based on the current concentrations of $C_2+$ and $C_3+$. Corresponding to the definition of $C_2+$, the abbreviation $C_3+$ stands for all hydrocarbons, except $CH_4$ and $C_2H_6$. By also measuring the $C_3+$ concentration, it is possible to consider the influence of $C_2H_6$ on the gas turbine operation by itself. Such correlation can advantageously be taken into account for the proposed further development.

Other important characteristics and advantages of the present invention are disclosed in the drawings and the respective description of the figures based on the drawings.

BRIEF DESCRIPTION OF THE DRAWINGS

The drawings show preferred exemplary embodiments of the invention and are described in more detail in the following description.

The following is shown schematically.

DETAILED DESCRIPTION OF EXEMPLARY EMBODIMENTS

Figure 1:
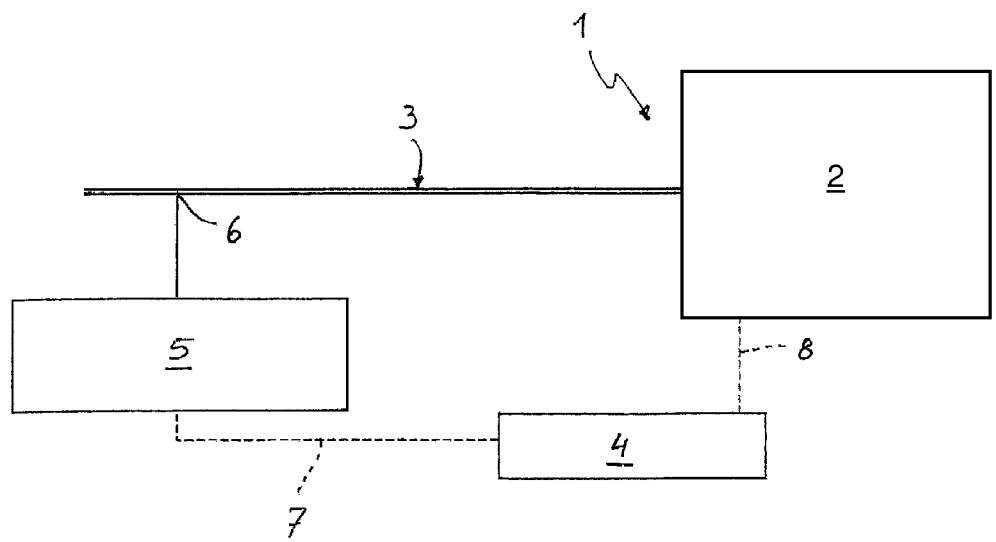
FIG. 1 a wiring diagram-type presentation of the principle of a gas turbine facility, FIGS. 2 through 4 various characteristic diagrams for gas turbine operating parameters.

According to FIG. 1, a gas turbine facility 1, especially in a power plant, includes at least one gas turbine 2 that is supplied with natural gas via a natural gas supply line 3. A control device 4 in which a suitable control procedure is carried out is arranged for operating the gas turbine 2. The control device 4 and/or the control procedure check the operating parameters of the gas turbine 2, such as the flame temperature of the combustion process in the combustion chamber of the gas turbine 2. Furthermore, it is possible to check the turbine inlet temperature as well as other temperatures. In addition, it is possible to check pollutant emissions, in particular $NO_x$ emissions. It also is possible to monitor the position of the flame front in the combustion chamber. The control device 4 and/or its procedure usually are utilized to operate the gas turbine 2 on a constant level at a pre-determined nominal operating point. In doing so, additional adjustments for changing load conditions (e.g. peak loads) are possible.

According to the invention, the gas turbine facility 1 additionally is equipped with a measuring device 5 with which $C_2+$ concentrations in the natural gas that is being fed into the gas turbine 2 can be measured. For this purpose the measuring device 5 is connected to the natural gas supply line 3 in 6. The measuring results, i.e., the $C_2+$ concentration, then are transmitted to the control device 4 via a corresponding signal or data transmission line 7 and are processed by the control device and/or its procedure. The control device 4 then operates the gas turbine 2 based on the current $C_2+$ concentration. The corresponding control signals are transmitted via a control signal line 8.

The measuring device 5 can have a gas-phase chromatograph that works relatively slowly, for example. Such a gas-phase chromatograph has a delay time of several minutes. If changes in the gas composition or $C_2+$ concentration are to be recorded faster, it is also possible to use other suitable devices, such as a flame ionization detector or an infrared spectrometer, for example, that respond within seconds.

When measuring the $C_2+$ concentration, the total share of all higher saturated hydrocarbons is measured and combined in an integral concentration. In order to be able to take the effects of $C_2H_6$ concentrations in natural gas into account in a differentiated manner, it is possible to separately record the $C_2H_6$ concentration as well. However, it is easier to use a method in which the integral concentration of $C_3+$ in addition to the concentration of $C_2+$ is determined. The difference then corresponds to the concentration of $C_2H_6$.

In a further development, the control device 4 can therefore operate the gas turbine 2 based on the $C_2+$ and $C_3+$ concentrations. This type of differentiation in principle can be even more refined, for example, by also measuring the $C_4+$ concentration, which allows for an isolated consideration and taking into account of the influence of $C_4H_8$.

It is important to note that the respective concentration, especially that of $C_2+$ and $C_3+$, is determined while the gas turbine 2 is operated, i.e. more or less online, in order to be able to adapt the operation of the gas turbine 2 to changing concentrations of $C_2+$ and/or $C_3+$ as quickly as possible.

The adjustment of the operation of the gas turbine 2 to the current concentrations of $C_2+$ and/or $C_3+$ suitably occurs by varying at least one operating parameter of the gas turbine 2 based on the current concentrations of C2+ and/or $C_3+$. Operating parameters that are especially suitable for an adjustment of the gas turbine operation to the current concentrations of $C_2+$ and/or $C_3+$ are, for example, flame temperature $T_F$, as well as a turbine inlet temperature $T_{IT}$. Therefore, an embodiment is preferred in which the control device 4 or its procedure reduce the flame temperature $T_F$ and/or the turbine inlet temperature $T_{IT}$ with increasing concentrations of $C_2+$ and/or $C_3+$. As explained above, an increasing concentration of $C_2+$ and/or $C_3+$ results in a shortening of the ignition delay time and a reduction in the spontaneous ignition temperature of the natural gas. The reduction in the flame temperature $T_F$ and/or the turbine inlet temperature $T_{IT}$ counteracts this and results in a certain offset.

Of special interest is an embodiment in which the reduction of the flame temperature $T_F$ and/or the turbine inlet temperature $T_{IT}$ is or are carried out in a manner that ensures that a suitable reference temperature that is checked by the control device 4 remains substantially constant. A point that is subject to flashbacks is especially suitable for measuring such a reference temperature. For example, the reference temperature can be measured on or in a burner and/or on a lance for the injection of the natural gas.

The adjustment of the flame temperature $T_F$ and/or the turbine inlet temperature $T_{IT}$ to the current concentrations of $C_2+$ and/or $C_3$ can be carried out additionally or alternatively in a manner that ensures that a pollutant emissions value, preferably for $NO_x$ emissions, remains mainly constant. In addition or alternatively, the resetting of the flame temperature $T_F$ and/or the turbine inlet temperature $T_{IT}$ can occur in a manner that ensures that the position of the flame front in the combustion chamber remains substantially constant.

Figure 2:
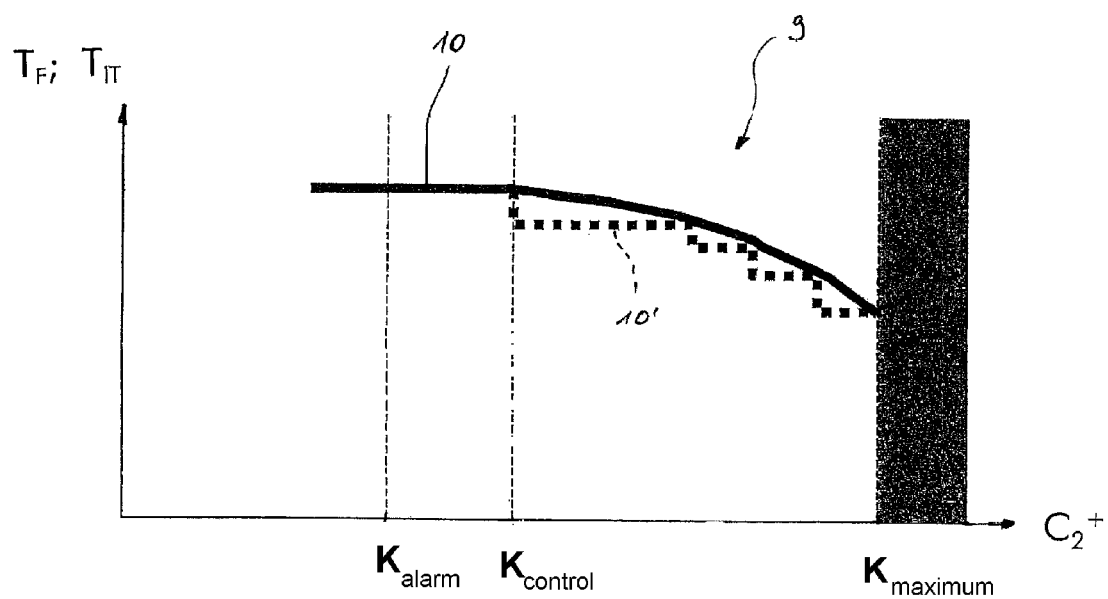

FIG. 2 shows a characteristic diagram 9 in which a characteristic line 10 is indicated. This characteristic line 10 describes the functional connection between the flame temperature $T_F$ and/or the turbine inlet temperature $T_{IT}$ that is entered on the ordinate and the concentration of $C_2+$ in the natural gas that is entered on the abscissa. The flame temperature $T_F$ and/or the turbine inlet temperature $T_{IT}$ represent the operating parameters of the gas turbine 2 that are set and checked by the control device 4. As discussed above, it is advantageous for the operation of the gas turbine to lower the flame temperature $T_F$ and/or the turbine inlet temperature $T_{IT}$ with increasing $C_2+$ concentration.

As rule the adjustment of the above operating parameters $T_F$ and/or $T_{IT}$ can be carried out continuously. However, an embodiment is practical in which an adjustment of the indicated operating parameters $T_F$, $T_{IT}$ only occurs above a control concentration $K_{control}$ of $C_2+$ in natural gas. This means that at $C_2+$ concentrations below control concentration $K_{control}$, the flame temperature $T_F$ and/or the turbine inlet temperature $T_{IT}$ remain constant in the characteristic line 10. Starting with this control concentration $K_{control}$ the respective operating parameter $T_F$, $T_{IT}$ is reduced with increasing $C_2+$ concentration. This reduction can be continuous in accordance with the solid characteristic line 10. The dotted line, on the other hand, indicates a discontinuous or incremental variation of the characteristic line 10' at which the respective operating parameter $T_F$, $T_{IT}$ incrementally follows the current value of the $C_2+$ concentration.

In addition, characteristic line 9 [sic] contains an alert concentration $K_{alert}$ that is smaller than the control concentration $K_{control}$. As soon as the current $C_2+$ concentration exceeds this alert concentration $K_{alert}$, the control device 4 emits a corresponding warning signal that can be processed accordingly. This alert concentration $K_{alert}$ can be such that it takes into account inaccuracies and delay times for measuring the $C_2+$ concentration.

Furthermore, a maximum concentration $K_{maximum}$ that is larger than the control concentration $K_{control}$ is entered in characteristic diagram 9. As soon as the $C_2+$ concentration reaches or exceeds the maximum concentration $K_{maximum}$, the control device 4 generates an emergency signal that can be processed in a suitable manner. In extreme cases, for example, the gas turbine 2 can be shut down.

The above concentrations $K_{control}$, $K_{alert}$, $K_{maximum}$ are preset and can be determined empirically or based on calculation models, for example.

Control concentration $K_{control}$ can have a value of 9 to 12 vol. % $C_2+$ in natural gas, for example. The alert concentration $K_{alert}$ can have a value between 7 and 12 vol. % $C_2+$ in natural gas, for example. A value of at least 16 vol. % in natural gas can be preset for maximum concentration $K_{maximum}$.

Figure 3:
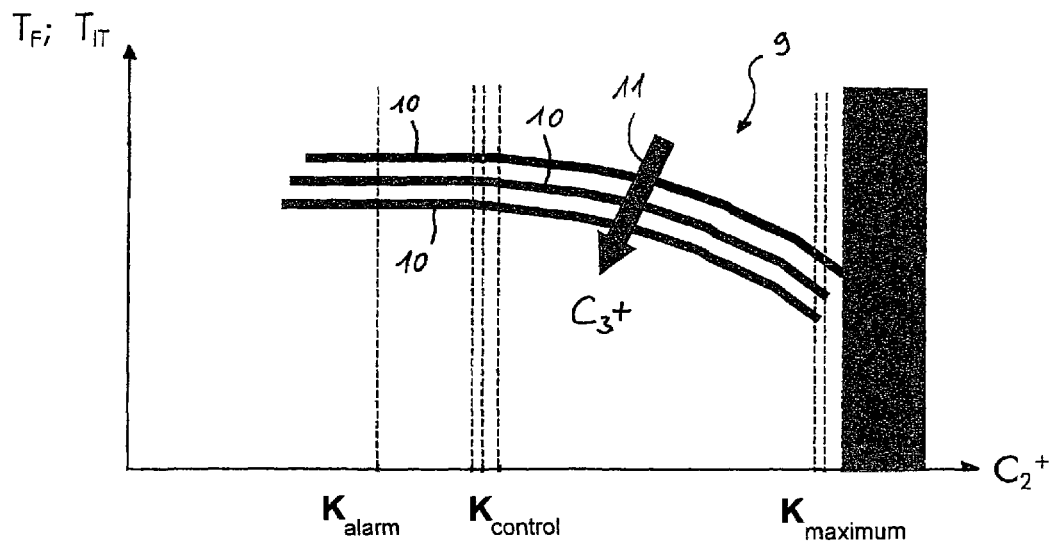

If, in addition to the $C_2+$ concentration, the $C_3+$ concentration in natural gas is determined and evaluated as well, it might be practical to place several characteristic lines 10 in characteristic diagram 9 as shown in FIG. 3 in order to indicate the dependence between the respective operating parameter (e.g. flame temperature $T_F$ and/or turbine inlet temperature $T_{IT}$) and the concentration of $C_2+$. These characteristic lines 10 correspond to different concentrations of $C_3+$, which is indicated by an arrow 11 in FIG. 3. The $C_3+$ concentration increases in the direction of the arrow. For the control device 4 this means that the correct characteristic line 10 must be selected depending on the current $C_3+$ concentration, and then the correct operating parameter such as $T_F$ and/or $T_{IT}$ is determined based on the selected characteristic line 10, depending on the current $C_2+$ concentration. According to FIG. 3, the different characteristic lines 10 in characteristic diagram 9 accordingly are assigned different control concentrations $K_{control}$, as well as different maximum concentrations $K_{maximum}$, while alert concentration $K_{alert}$ is the same for all characteristic lines 10.

Figure 4:
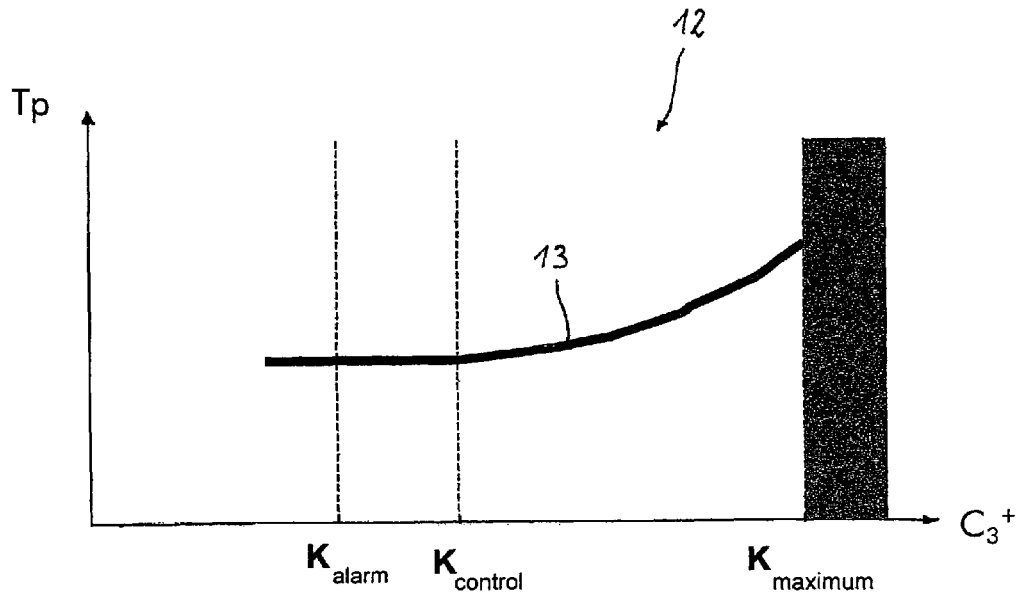

While in the above examples flame temperature $T_F$ and turbine inlet temperature $T_{IT}$ are given as examples of operating parameters that can be adapted alternatively or cumulatively, depending on the current $C_2+$ and/or $C_3+$ concentrations, it is clear that the present invention is not limited to influencing these operating parameters. FIG. 4 therefore shows examples of an additional operating parameter that can be adjusted, depending on the current concentrations of $C_2+$ and/or $C_3+$.

It was found that the $C_2+$ concentration and to an even greater degree the $C_3+$ concentration influences the dew point of natural gas, and an increasing concentration of higher saturated hydrocarbons results in an increase of the dew point temperature. In order to avoid the development of condensation in the fuel distribution system of gas turbine 2, it is therefore practical to adapt a preheating temperature $T_P$ of the natural gas to the current $C_2+$ and/or $C_3+$ concentrations.

Accordingly, FIG. 4 shows a characteristic line 13 in another characteristic diagram 12 that reflects the correlation between the preheating temperature $T_P$ (ordinate) and in this case the $C_3+$ concentration (abscissa). The control device 4 accordingly causes an increase in the preheating temperature $T_P$ of the natural gas with increasing $C_3+$ concentration and starting with control concentration $K_{control}$. The risk that condensation might form is therefore reduced due to an increasing dew point temperature.

LIST OF REFERENCES 1 gas turbine facility
2 gas turbine
3 natural gas supply line
4 control device
5 measuring device
6 measuring point
7 signal or data transmission line
8 control line
9 characteristic diagram
10 characteristic line
11 arrow
12 characteristic diagram
13 characteristic line
$F_T$ flame temperature
$T_{IT}$ turbine inlet temperature
$T_P$ preheating temperature
$C_2+$ concentration of $C_2+$
$C_3+$ concentration of $C_3+$
$K_{alert}$ alert concentration
$K_{control}$ control concentration
$K_{maximum}$ maximum concentration While the invention has been described in detail with reference to exemplary embodiments thereof, it will be apparent to one skilled in the art that various changes can be made, and equivalents employed, without departing from the scope of the invention. Each of the aforementioned documents is incorporated by reference herein in its entirety.

The invention claimed is:

1. A method for operating a gas turbine which is supplied with natural gas, the method comprising:
    measuring, during the operation of the gas turbine, the $C_2+$ concentration in natural gas that is supplied to the gas turbine; and
    operating the gas turbine based on the measured current concentration of $C_2+$, said operating comprising, with increasing $C_2+$ concentration,
        reducing a flame temperature, or
        reducing a turbine inlet temperature, or
        increasing a preheating temperature, or
        combinations thereof.

2. A method according to claim 1, comprising:
    measuring the $C_3+$ concentration in the natural gas during the operation of the gas turbine; and
    wherein operating comprises operating the gas turbine based on the measured current $C_2+$ and $C_3+$ concentrations.

3. A method according to claim 1, wherein a control procedure for operating the gas turbine is adapted to the current $C_2+$ concentration.

4. A method according to claim 1, comprising:
    adapting at least one operating parameter of the gas turbine to the current $C_2+$ concentration.

5. A method according to at least claim 4, wherein adapting comprising adapting according to a characteristic diagram in which a characteristic line is indicated for at least one operating parameter that changes based on the $C_2+$ concentration and that shows the respective operating parameter as a function of $C_2+$ concentration.

6. A method according to claim 5, wherein the characteristic diagram for at least one operating parameter that is changed based on the $C_2+$ concentration contains at least two characteristic lines that are allocated to different $C_3+$ concentrations.

7. A method according to claim 1, wherein said reduction of the flame temperature, said reduction of the turbine inlet temperature, or both, is carried out so that:
    a reference temperature that is measured at a location subject to flashback remains constant; or
    a pollutant emissions value remains constant; or
    a position of the flame front remains constant in a combustion chamber of the gas turbine; or
    combinations thereof.

8. A method according to claim 7, comprising:
    measuring the reference temperature at a burner or a natural gas injection lance.

9. A method according to claim 7, wherein the pollutant emissions value comprises a $NO_x$ emissions value.

10. A method according to claim 1, wherein operating the gas turbine based on the current $C_2+$ concentration comprises operating above a preset control concentration.

11. A method according to claim 10, wherein the control concentration is approximately 9 to 12 vol. % $C_2+$ in natural gas.

12. A method according to claim 1, comprising:
    generating a warning signal when the current $C_2+$ concentration exceeds a preset alert concentration.

13. A method according to claim 12, wherein the alert concentration is less than the control concentration.

14. A method according to claim 12, wherein the alert concentration is approximately 7 to 10 vol. % $C_2+$ in natural gas.

15. A method according to claim 1, comprising:
generating an emergency signal when the current $C_2+$ concentration exceeds a preset maximum concentration.

16. A method according to claim 15, wherein the maximum concentration is approximately at least 16 vol. % $C_2+$ in natural gas.

17. A method according to claim 1:
wherein operating the gas turbine based on the current $C_2+$ concentration comprises operating above a preset control concentration which is approximately 9 to 12 vol. % $C_2+$ in natural gas; or
comprising generating a warning signal when the current $C_2+$ concentration exceeds a preset alert concentration which is approximately 7 to 10 vol. % $C_2+$ in natural gas; or
comprising generating an emergency signal when the current $C_2+$ concentration exceeds a preset maximum concentration which is approximately at least 16 vol. % $C_2+$ in natural gas; or
combinations thereof.

18. A method according to claim 1, wherein measuring the $C_2+$ concentration comprises measuring with a gas-phase chromatograph, a flame ionization detector, an infrared spectrometer, or combinations thereof.

19. A method according to claim 1, wherein the gas turbine is part of a power plant.

20. A gas turbine comprising:
a control device configured and arranged to operate a gas turbine;
a measuring device configured and arranged to measure $C_2+$ concentrations in natural gas supplied to the gas turbine;
wherein the control device operates the gas turbine based on the measured current $C_2+$ concentration such that, with increasing $C_2+$ concentration, the control device operates the gas turbine to
reduce a flame temperature, or
reduce a turbine inlet temperature, or
increase a preheating temperature, or
combinations thereof.

21. A gas turbine according to claim 20, wherein the measuring device is configured and arranged to measure $C_3+$ concentrations.

22. A power plant comprising a gas turbine according to claim 20.

* * * * *